United States Patent Office
3,139,440
Patented June 30, 1964

3,139,440
METHOD OF PRODUCING CARBONATE ESTERS FROM FORMALS USING OZONE
Allison Maggiolo, Merion, Pa., assignor to The Welsbach Corporation, Philadelphia, Pa., a corporation of Delaware
No Drawing. Filed Feb. 23, 1961, Ser. No. 102,911
6 Claims. (Cl. 260—340.2)

This invention relates to processes for the production of carbonate esters by ozonolysis of formals.

Production and use of carbonate esters are increasing rapidly in the chemical process industry. Present production methods are costly and uncertain. Carbonate esters are widely used in the production of polymers, adhesives, as solvents for polyamide resins, in the production of aromatic polyesters and perfumes among others.

The classical reaction of ozone and ethylenic double bonds and the reaction of ozone with acetylenic triple bonds have been discussed in a variety of publications and used in many inventions. These and other reactions of ozone have shown that carboxylic acids, aldehydes, carbonyl compounds, peroxides, hydroxy-hydroperoxides, alcohols, sulfoxides and sulfones, can be made from a variety of starting materials. In many cases the mechanisms of the ozone attack on the particular starting material can be determined by the nature of the end products. The active centers of one class of compounds might be a result of electrophylic nature of the starting compound with respect to the ozone molecule. In other cases, solvent participation, stearic hinderances and possibly other considerations tend to affect the nature of the ozone attack on certain starting materials.

In particular, this invention deals with the ozone oxidation of formals, the general formula of which is:

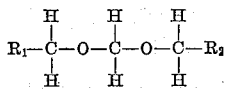

where $R_1$ and $R_2$ may be hydrogen or saturated aliphatic groups of the paraffinic homologous series beginning with methane and having the general formula of $C_nH_{2n+1}$ where the $n$ is the number of carbon atoms in the R group. The general structure of a formal consists of a methylene carbon, the two oxygen atoms adjacent to the methylene carbon, and two other methylene carbons one each attached to each oxygen atom.

It is therefore an object of this invention to utilize the unexpected nature of the ozone attack on a formal in the production of carbonate esters.

It is another object of this invention to utilize the unexpected nature of the ozone molecule attack on formals having terminal groups consisting of aliphatic saturated hydrocarbons having a chain length of from 1 to 3 carbons.

It is still another object of this invention to utilize the unexpected nature of the ozone molecule attack on formals contained in a closed ring system.

Another and further object will be apparent from the following detailed descriptions of illustrative examples of the present concept.

One skilled in the art may change the illustrative processes described hereinafter by routine use of various temperatures, solvents, and additional chemicals without departing from the present invention as defined in the claims.

Most unexpectedly I have found that the ozone attack on the formal is selective without regard to the chain length of the terminal groups; even in the case of cyclic formals, and regardless of the participation of a solvent.

Heretofore the selective nature of the ozone attack on a formal was unknown. Most unexpectedly it was found that the carbon located between the two oxygen atoms of the formal, hereinafter referred to as the "formal carbon," is attacked preferentially by the ozone regardless of the chain length of the terminal groups even when the terminal groups are connected to each other in a cyclic formal, and regardless of the presence or absence of a solvent for the formal. This preferential attack on the "formal carbon" instead of on one of the methylene carbons located beta to the "formal carbon" is even more unexpected since there are twice as many of the methylene carbons available for oxidation.

In one illustrative example of the present invention, the simplest formal, a dimethoxymethane, was reacted with ozone to give dimethylcarbonate. The details of this reaction are given below as Example I:

Example I

Ozone was generated from pure oxygen at a gas flow rate of 40 ml./min, in an electric discharge ozonator. Production of ozone was determined using standard methods and was found to be 7 mg./min. The mixed gas of ozone and oxygen was introduced into a stirred reactor at room temperature. Any unreacted ozone was absorbed in a neutral potassium iodide trap. The ozonized mixture was then analyzed on a standard gas liquid phase chromatographic apparatus using an internal standard. The fractionating column of the analyzer was diethylene glycol succinate on fire brick operated at a temperature between 100 and 190° C.

When 0.387 g. of ozone were reacted with 4.1 g. of methylal (dimethoxymethane) 0.318 g. ozone were absorbed. Additional methylal was added to the reactor because of volatile losses to the gas stream. The ozonized product was then analyzed using butyl butyrate as an internal standard. The yield of dimethylcarbonate was 0.127 g.

It is apparent from Example I that ozone reacts preferentially with the "formal carbon" to give dimethylcarbonate. It might be reasoned that additional carbons present in the terminal groups could shift the reactive center from the "formal carbon" to the alpha carbon of the terminal group adjacent to the oxygen atom. In another illustrative example of the present invention terminal groups were selected containing the carbon atoms and the results of ozone oxidation of this formal are found in Example II showing that the reactive center is not shifted.

Example II

The procedural steps of Example I were followed and 0.246 g. of ozone were reacted with 4.0 g. of di-n-propoxymethane and 0.236 g. of ozone were absorbed. The ozonized product was analyzed by the technique described in detail in Example I, using butyl butyrate as an internal standard. The yield of dipropylcarbonate was 0.106 g.

From Example II, describing the ozonolysis of dipropoxymethane to give dipropylcarbonate, it is apparent that the chain length of the terminal group of the formal does not affect the selectivity of the reaction of ozone with respect to the "formal carbon." Terminal groups containing up to about six carbons do not adversely affect the selectivity of the reaction of ozone with respect to the "formal carbon" when formals are oxidized with ozone.

Furthermore, rearrangement of the terminal groups, as by a substituted group on the beta carbon from the oxygen atom of the formal, does not alter the reactivity of the "formal carbon" when oxidized by ozone. However, substitution on the alpha carbon of the formal adjacent to the oxygen atom may alter the reactivity of the "formal carbon" sufficiently to cause a considerable amount of ozone to react with the alpha carbon, preferentially to the "formal carbon."

From the general structure of the formal as described above and from the results shown in Examples I and II, a cyclic formal is considered a modification of the general structure already discussed. In the case of a cyclic formal, the terminal groups are connected to each other. Since the reactivity of the "formal carbon" is unaffected by a variation in the chain length of the terminal groups attached to each alpha carbon, variations in the number of carbons in a cyclic ring of a formal do not affect the "formal carbon" reactivity.

In Example III, below, the reactivity of the "formal carbon" is shown in a cyclic formal when ozonolyzed in a solvent system. In Example IV, below, the reactivity of the "formal carbon" is shown when ozonolyzed without a solvent.

*Example III*

The general procedures of Example I were followed and 0.229 g. of ozone were applied to a solution of t-butyl alcohol containing 0.260 g. of 1,3 dioxolane. 0.157 g. of ozone were absorbed. The product was analyzed using dimethyl adipate as an internal standard. The yield of ethylene carbonate was 0.052 g.

*Example IV*

The general procedures of Example I were followed and 0.264 g. of ozone were reacted with 5.0 g. of 1,3 dioxolane at room temperature. All the ozone was absorbed. The product was analyzed using dimethyl adipate as an internal standard. The yield of ethylene carbonate was 0.304 g.

From Example III, it is shown that the selectivity of ozone with respect to the "formal carbon" is not affected by the cyclic system. Ring systems up to about six carbons do not change the selectivity of ozone with respect to the "formal carbon" for cyclic compounds.

From Example IV and in view of the results described in Example III, dioxolane, a cyclic formal, can be ozonolyzed with and without a solvent system. The selectivity of ozone with respect to the "formal carbon" is not affected by the presence or the absence of a participating solvent, as is shown by the yield of ethylene carbonate in both Examples III and IV.

Various theories may be advanced in explanation of the selective preferential oxidation of ozone to the "formal carbon" as described above, but none can be proved and discussion of these theories will be omitted so as not to burden the present specification.

It should now be apparent that the present invention in every way satisfies the several objectives discussed above.

Changes in or modifications to the illustrative embodiments of the processes of the present invention described above may now be suggested to those skilled in the art without departing from the present inventive concept. Reference should therefore be had to the appended claims to determine the scope of this invention.

What is claimed is:

1. In a process for the production of carbonate esters from a formal having the formula:

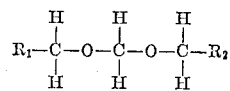

where $R_1$ and $R_2$ are selected from the group consisting of hydrogen and saturated paraffinic hydrocarbon groups having from one to six carbon atoms, the step of reacting the formal with ozone.

2. A process as described in claim 1, in which the formal is cyclic, the number of carbons in the closed ring being no less than three and no greater than nine.

3. A process as described in claim 1 in which the formal is dimethoxymethane, and the carbonate ester is dimethylcarbonate.

4. A process as described in claim 1 in which the formal is di-n-propoxymethane and the carbonate ester is dipropoxycarbonate.

5. A process as described in claim 1 in which the formal is 1,3 dioxolane, in t-butyl alcohol and the carbonate ester is ethylene carbonate.

6. A process as described in claim 2 in which the formal is 1,3 dioxolane, and the carbonate ester is ethylene carbonate.

No references cited.